US012230226B2

(12) United States Patent
Weindorf et al.

(10) Patent No.: US 12,230,226 B2
(45) Date of Patent: Feb. 18, 2025

(54) POWER DISSIPATION FOR FULL AREA LOCAL DIMMING (FALD) DISPLAY

(71) Applicant: VISTEON GLOBAL TECHNOLOGIES, INC., Van Buren Township, MI (US)

(72) Inventors: Paul Fredrick Luther Weindorf, Novi, MI (US); Brian John Hayden, Royal Oak, MI (US); Danail Krasimirov Totev, Sofia (BG)

(73) Assignee: Visteon Global Technologies, Inc., Van Buren Township, MI (US)

( * ) Notice: Subject to any disclaimer, the term of this patent is extended or adjusted under 35 U.S.C. 154(b) by 0 days.

(21) Appl. No.: 18/595,997

(22) Filed: Mar. 5, 2024

(65) Prior Publication Data

US 2024/0304158 A1 Sep. 12, 2024

Related U.S. Application Data

(60) Provisional application No. 63/488,843, filed on Mar. 7, 2023.

(51) Int. Cl.

| | |
|---|---|
| ***G09G 3/34*** | (2006.01) |
| ***G09G 3/20*** | (2006.01) |
| ***G09G 3/36*** | (2006.01) |

(52) U.S. Cl.

CPC ......... *G09G 3/3426* (2013.01); *G09G 3/2007* (2013.01); *G09G 3/36* (2013.01); *G09G 2320/0233* (2013.01); *G09G 2320/0626* (2013.01); *G09G 2330/021* (2013.01); *G09G 2360/16* (2013.01)

(58) Field of Classification Search

CPC ............... H10K 59/131; H10K 59/352; H10K 59/1213; G09G 3/3258; G09G 2300/0426; G09G 2300/0452; G09G 2300/0819; G09G 2300/0842; G09G 2300/0861; G09G 3/3233; G09G 3/3426; G09G 3/2007; G09G 3/36; G09G 2320/0233; G09G 2320/0626; G09G 2330/021; G09G 2360/16; H01L 29/7869; H01L 27/1225; H01L 27/124

See application file for complete search history.

(56) References Cited

U.S. PATENT DOCUMENTS

| | | | | |
|---|---|---|---|---|
| 11,281,047 | B1 | 3/2022 | Dunn et al. | |
| 2011/0141155 | A1 | 6/2011 | Hong et al. | |
| 2015/0371613 | A1 | 12/2015 | Patel et al. | |
| 2020/0202798 | A1 | 6/2020 | Kimbrell et al. | |
| 2021/0012727 | A1 | 1/2021 | Chang et al. | |
| 2021/0020116 | A1* | 1/2021 | Sun ...................... | G09G 3/3406 |
| 2022/0180801 | A1 | 6/2022 | Kim et al. | |

(Continued)

FOREIGN PATENT DOCUMENTS

| | | | |
|---|---|---|---|
| WO | 2018132987 | A1 | 7/2018 |

*Primary Examiner* — Pegeman Karimi

(74) *Attorney, Agent, or Firm* — Quinn IP Law

(57) ABSTRACT

A controller configured for minimizing power dissipation of a full area local dimming (FALD) display. The controller configured for determining an input grayscale value for each of a plurality of pixels comprising the image, remapping the input grayscale values to output grayscale values, displaying the image according to the output grayscale values, and controlling a normalized backlight luminance for each zone according to a maximum grayscale value determined therefor.

20 Claims, 5 Drawing Sheets

(56) References Cited

U.S. PATENT DOCUMENTS

| | | | | |
|---|---|---|---|---|
| 2022/0335907 | A1* | 10/2022 | Shi .................... | G09G 3/3426 |
| 2022/0365394 | A1 | 11/2022 | Chen et al. | |
| 2022/0415272 | A1* | 12/2022 | Xiong .................. | G09G 3/3426 |
| 2023/0012198 | A1 | 1/2023 | Hyun et al. | |

* cited by examiner

POWER DISSIPATION FOR FULL AREA LOCAL DIMMING (FALD) DISPLAY

CROSS-REFERENCE TO RELATED APPLICATIONS

This application claims the benefit of U.S. Provisional Application No. 63/488,843, filed Mar. 7, 2023, which is hereby incorporated by reference in its entirety.

INTRODUCTION

The present disclosure relates to managing power dissipation for displays, such as but not necessarily limited to managing power dissipation for full area local dimming (FALD) displays.

A liquid crystal display (LCD), a thin-film-transistor liquid-crystal display (TFT LCD), a TFT display, or other type of display may rely upon a backlight to enhance image resolution, intensity, brightness, etc. One skilled in the art may generally recognize edge lit and full area local dimming (FALD) as two of the more common types of backlighting systems. An edge lit backlight may be configured with a light guide plate operable for extracting light from an outer perimeter or edge to uniformly backlight the display, i.e., the entire display may be illuminated with an equal amount of luminance throughout. A FALD backlight may, in contrast, provide a plurality of illumination zones directly behind an entirety of the display, with a luminance of each illumination zone being independently controllable. The independently controllable illumination zones may provide unequal or disparate amounts of luminance at discrete segments of the display. The amount of backlighting needed may be dependent on images presented within the display, which in the case of video displays, may correspond with a plurality of image frames to be successively presented.

Because edge lit backlighting systems lack an ability to selectively control luminance for different segments of the display, a relatively greater amount of power savings may be achieved with FALD backlight systems independently and selectively controlling luminance across a plurality of illumination zones, optionally with different illumination zones simultaneously having differing luminance. A FALD backlight system, accordingly, and unlike an edge lit backlighting system, may be able to individualistically manage the luminance at each of the illumination zones so that the luminance, and thereby the power dissipation, may be selectively minimized when unnecessary for the image associated therewith.

SUMMARY

One non-limiting aspect of the present disclosure relates to managing power dissipation for display systems having capabilities for variably controlling luminance, such as but not necessarily limited to full area local dimming (FALD) displays having a backlight configured for variably controlling luminance according to a plurality of discrete, illumination zones. Each illumination zone may be individualistically and separately controlled to provide a minimum amount of light needed for backlighting a corresponding portion of a display, thereby minimizing power dissipation and maximizing power savings.

One non-limiting aspect of the present disclosure relates to full area local dimming (FALD) display. The display may include a liquid crystal display (LCD) and a backlight having a plurality of light emitting diodes (LEDs) configured for backlighting the LCD. The LEDs may be arrayed according to a plurality of zones. The display may further include a display controller configured for identifying an image to be displayed with the LCD, determining an input grayscale value for each of a plurality of pixels comprising the image, remapping the input grayscale values to output grayscale values, and controlling the LCD to display the image according to the output grayscale values. The display may still further include a backlight controller configured for determining a maximum grayscale value for each of the illumination zones, optionally with the maximum grayscale value for each illumination zone corresponding with a greatest one of the input grayscale values therein, and controlling a normalized backlight luminance for each illumination zone according to the maximum grayscale value determined therefor.

The display controller may be configured for remapping the input grayscale values on a zone-by-zone basis according to a remapping function represented as:

$$GS_N = GS_O\left(\frac{B}{GS_{Omax}}\right)^{\gamma_i/\gamma}$$

where $GS_N$ corresponds with the output grayscale values, GSo corresponds with the input grayscale values, B corresponds with a grayscale bit level for the LCD, GSomax corresponds with the maximum grayscale value of the input grayscale values for the corresponding one of the illumination zones, $\gamma$ corresponds with a transmissivity gamma coefficient for the LCD, and $\gamma_i$ corresponds with an intensity gamma coefficient.

The backlight controller may be configured for determining the normalized backlight luminance for each illumination zone on a zone-by-zone basis according to a luminance function represented as:

$$I_N = \left(\frac{GS_{Omax}}{B}\right)^{\gamma_i}$$

where $I_N$ corresponds with the normalized backlight luminance.

The display may be include:

$$B = (2)^n - 1$$

where n is a quantity of bits allocated for each pixel.

Each pixel may include a red subpixel, a green subpixel, and a blue subpixel, optionally with the remapping occurring on a subpixel-by-subpixel basis.

The display may include:

n=8 when the grayscale bit level is 8.

The display may include:

$\gamma$ equals $\gamma_i$.

display may include:

$$1 < \gamma_i \leq \gamma.$$

The display controller may be configured for remapping the input grayscale values on a zone-by-zone basis such that the input grayscale values within each of the illumination zones are each proportionally increased until at least one pixel therein has a maximum possible grayscale value.

One non-limiting aspect of the present disclosure relates to a method for minimizing power dissipation of a full area local dimming (FALD) display. The FALD display may include a display configured for displaying an image and a backlight having a plurality of illumination zones configured for backlighting the display. The method may include determining an input grayscale value for each of a plurality of pixels comprising the image, remapping the input grayscale values to output grayscale values, displaying the image according to the output grayscale values, determining a maximum grayscale value for each of the illumination zones, optionally with the maximum grayscale value for each illumination zone corresponding with a greatest one of the input grayscale values therein, and controlling a normalized backlight luminance for each illumination zone according to the maximum grayscale value determined therefor.

The method a may include determining the normalized backlight luminance for each illumination zone on a zone-by-zone basis according to a luminance function represented as:

$$I_N = \left(\frac{GS_{Omax}}{B}\right)^{\gamma_i}$$

where $I_N$ corresponds with the backlight luminance, B corresponds with a grayscale bit level for the display, GSomax corresponds with the maximum grayscale value of the input grayscale values for the corresponding one of the illumination zones, and $\gamma_i$ corresponds with an intensity gamma coefficient.

The may include remapping the input grayscale values on a zone-by-zone basis according to a remapping function represented as:

$$GS_N = GS_O\left(\frac{B}{GS_{Omax}}\right)^{\gamma_i/\gamma}$$

where $GS_N$ corresponds with the output grayscale values, GSo corresponds with the input grayscale values, and $\gamma$ corresponds with a transmissivity gamma coefficient for the display.

The method may include:

$$B = (2)^n - 1$$

where n is a quantity of bits allocated for each pixel.

The method may include:

$$1 < \gamma_i \leq \gamma.$$

The method may include remapping the input grayscale values on a zone-by-zone basis such that the input grayscale values within each illumination zone are each proportionally increased until at least one pixel therein has a maximum possible grayscale value.

One non-limiting aspect of the present disclosure relates to a controller for a full area local dimming (FALD) display. The controller may include a computer-readable storage medium having a plurality of non-transitory instructions stored thereon, which when executed with a processor of the controller, may be operable for determining an input grayscale value for each of a plurality of pixels comprising an image to be displayed through a display, remapping the input grayscale values to output grayscale values, displaying the image according to the output grayscale values, determining a maximum grayscale value for each of a plurality of illumination zones comprising a backlight of the display, optionally with the maximum grayscale value for each illumination zone corresponding with a greatest one of the input grayscale values therein, and controlling a normalized backlight luminance for each illumination zone according to the maximum grayscale value determined therefor.

The non-transitory instructions may be operable for remapping the input grayscale values on a zone-by-zone basis according to a remapping function represented as:

$$GS_N = GS_O\left(\frac{B}{GS_{Omax}}\right)^{\gamma_i/\gamma}$$

where $GS_N$ corresponds with the output grayscale values, GSo corresponds with the input grayscale values, B corresponds with a grayscale bit level for the display, GSomax corresponds with the maximum grayscale value of the input grayscale values for the corresponding one of the illumination zones, $\gamma$ corresponds with a transmissivity gamma coefficient for the display, and $\gamma_i$ corresponds with an intensity gamma coefficient.

The non-transitory instructions may be operable for determining the normalized backlight luminance on a zone-by-zone basis according to a luminance function represented as:

$$I_N = \left(\frac{GS_{Omax}}{B}\right)^{\gamma_i}$$

where $I_N$ corresponds with the backlight luminance.

The controller may include:

$$B = (2)^n - 1$$

where n is a quantity of bits allocated for each pixel.

The controller may include:

$$1 < \gamma_i \leq \gamma.$$

The above features and advantages along with other features and advantages of the present teachings are readily apparent from the following detailed description of the modes for carrying out the present teachings when taken in connection with the accompanying drawings. It should be understood that even though the following Figures and embodiments may be separately described, single features thereof may be combined to additional embodiments.

BRIEF DESCRIPTION OF THE DRAWINGS

The accompanying drawings, which are incorporated into and constitute a part of this specification, illustrate implementations of the disclosure and together with the description, serve to explain the principles of the disclosure.

DETAILED DESCRIPTION

As required, detailed embodiments of the present disclosure are disclosed herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
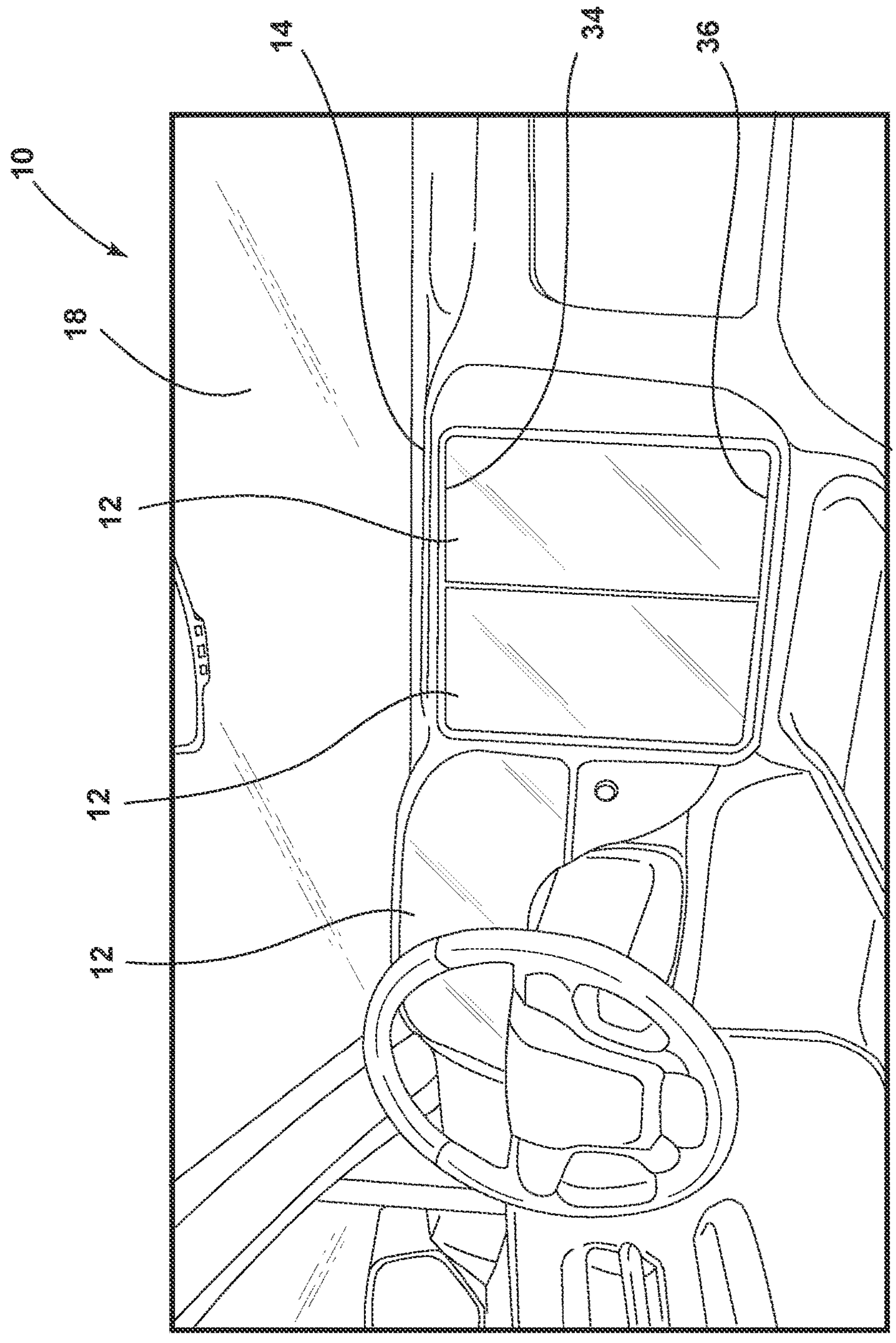
FIG. 1 illustrates a partial perspective view of a vehicle having a plurality of displays in accordance with one non-limiting aspect of the present disclosure.

FIG. 1 illustrates a partial perspective view of a vehicle 10 having a plurality of displays 12 in accordance with one non-limiting aspect of the present disclosure. The vehicle 10 is shown for non-limiting purposes as being an automobile having the displays 12 disposed within a dashboard 14 to demonstrate an advantageous capability of the present disclosure to manage power dissipation within an environment where it may be beneficial to minimize power consumption and to maximize power savings. The vehicle 10 is described as being an automobile, however, the present disclosure fully contemplates other types of displays 12 and display arrangements, including those found in other vehicles, such as trucks, motorcycles, watercraft, trains, and/or aircraft, and/or as part of stationary, non-vehicle objects, such as but not limited to, televisions, billboards, kiosks and/or marquees. The display 12 is predominantly described with respect to being configured as a full area local dimming (FALD) display for exemplary and non-limiting purposes as the present disclosure fully contemplates its use and application in other types of displays having capabilities for selectively, discreetly, independently, individually, or otherwise separately controlling backlighting luminance.

Figure 2:
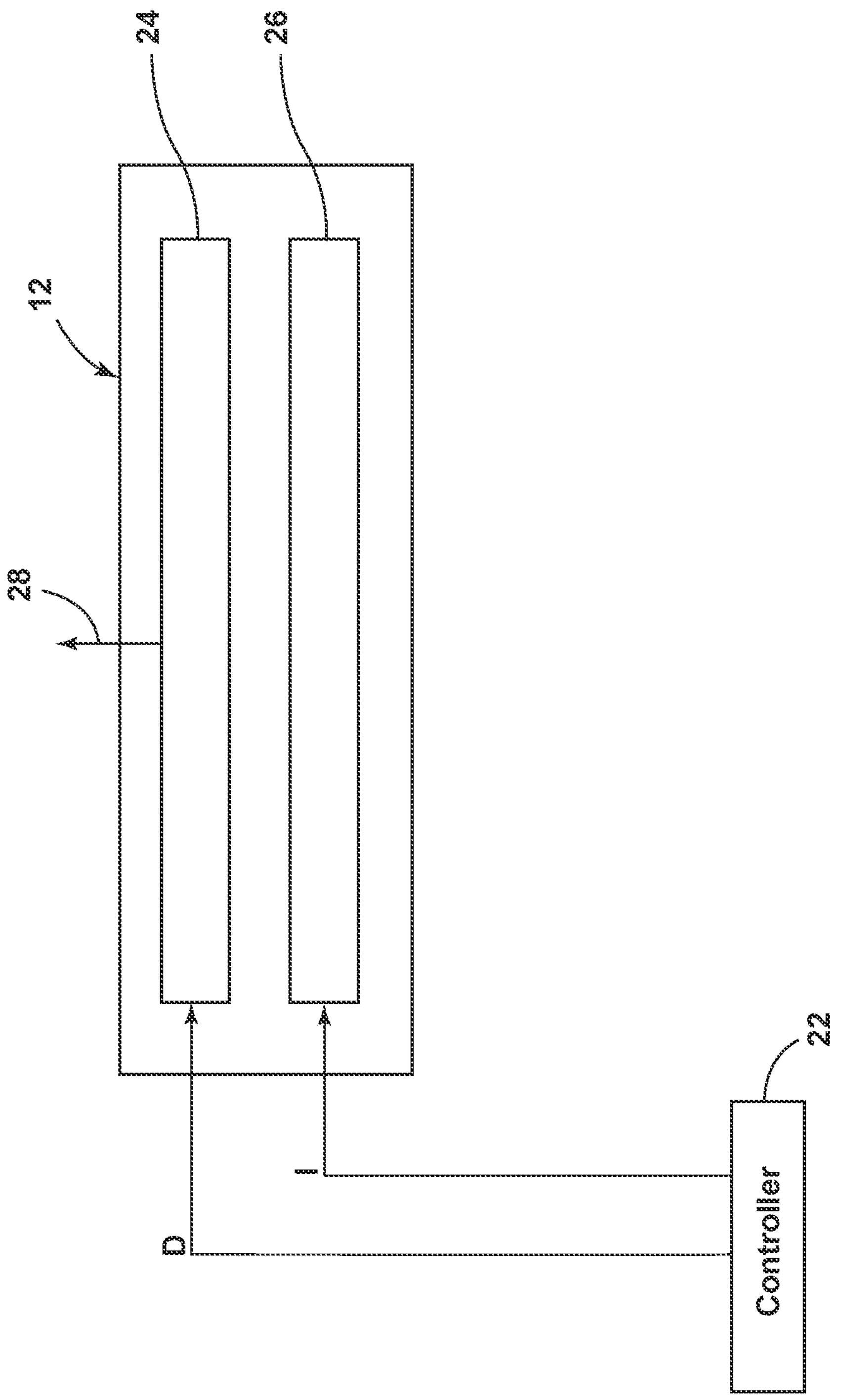
FIG. 2 illustrates a schematic diagram of a display in accordance with one non-limiting aspect of the present disclosure.

FIG. 2 illustrates a schematic diagram of the display 12 in accordance with one non-limiting aspect of the present disclosure. The display 12 may be electrically connected to a controller circuit 22 and may include a transmissive display screen or element 24 disposed relative to a backlight 26. An optical signal 28 may be presented from a surface 30 of the display 12 to convey visible images, data, information, words, numbers, pictures, graphical shapes, video, information, and other media, such as video (e.g., a rear-view camera video, a forward-view camera video, an on-board DVD player, etc.). A display signal (e.g., D) may be generated by the controller circuit 22 and received by the display element 24, which for example may be used to provide instrumentation (e.g. speed, tachometer, fuel, temperature, etc.) for presentation therewith. The display signal D may carry information used by the display element 24 to modulate the optical signal 28. The controller circuit 22 may be configured to generate an illumination signal (e.g., I) for controlling the backlight 26. The controller circuit 22 may generate and present brightness, luminance, and other information in the illumination signal I.

The controller circuit 22, may include one or more microcontrollers, such as the backlight controller and the display controller described below, which may optionally include one or more processors embodied as a separate processor, an Application Specific Integrated Circuit (ASIC), a Field Programmable Gate Array (FPGA), or a dedicated electronic control unit. The microcontrollers may be implemented in hardware, software executing on hardware, or a combination of both, which may also include tangible, non-transitory memory, (e.g., read only memory in the form of optical, magnetic, and/or flash memory). Computer-readable and executable instructions embodying the present disclosure may be stored in the memory and executed an associated processor as set forth herein. The executable instructions may be a series of non-transitory instructions employed to run applications on the microcontrollers. The microcontrollers may receive commands and information, such as in the form of one or more input signals from various controls or components, and control the transmissive element 24 according to one or more control signals transferred to the display 12.

The display element 24 may be configured to implement a display panel that modulates a light emitted from the backlight 26 as the light passes through from one side of the display element 24 to the other side. The display element 24 may be a color display element 24 or a black-and-white display element 24. The display element 24 may be mounted adjacent to (or adjoining) the backlight 26. The display element 24 may be operational to change opaqueness, color, luminance, etc. in different areas and in response to the display signal D, optionally with the changes generally modulating the intensity and the color to generate the optical signal 28. The modulated light may form the images in the optical signal 28. In various embodiments, the display element 24 may be implemented as a liquid crystal display (LCD), a thin-film-transistor liquid-crystal display (TFT LCD), a TFT display, or other type of display. Other display element 24 technologies may be implemented to meet the design criteria of a particular application.

Figure 3:
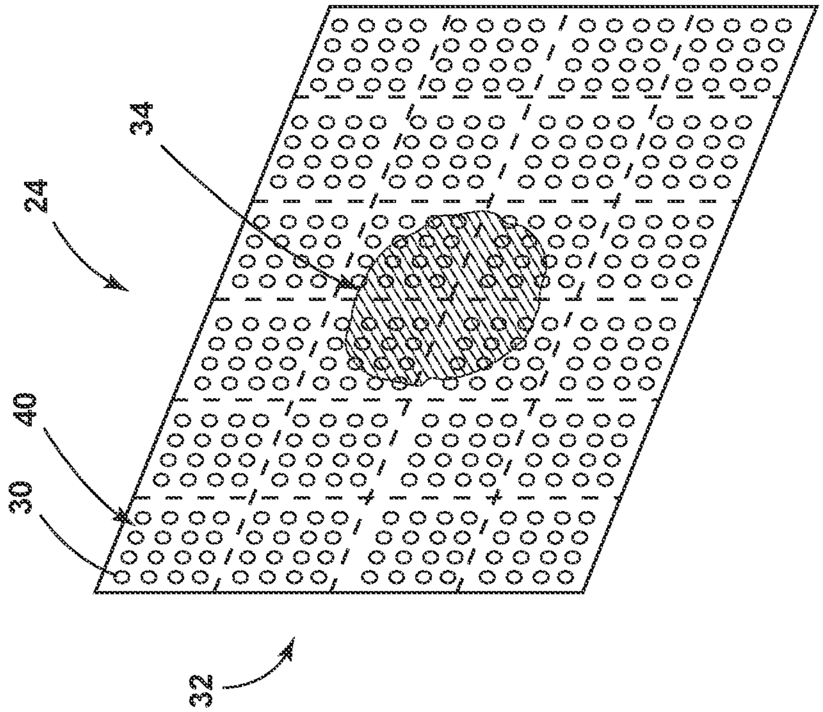
FIG. 3 illustrates a schematic diagram of a display element in accordance with one non-limiting aspect of the present disclosure.

FIG. 3 illustrates a schematic diagram of the display element 24 in accordance with one non-limiting aspect of the present disclosure. The display element 24 may be comprised of a plurality of pixels 30, which are shown individually with circles. The pixels 30 may be individually controlled according to the display signal D, such as in response to corresponding current and/or voltage controls. The pixels 30 may correspond with LEDs or other devices capable of facilitating the coloring operations contemplated herein. Each pixel 30 may include a plurality of subpixels (not labeled). The pixels 30, for example, may be of the RGB type having a red subpixel, a green subpixel, and a blue subpixel. The display signal D may include color values suitable for controlling a color output of each pixel 30 according to grayscale values selected for each of the corresponding subpixels. The display signal D, accordingly, may be configured to define grayscale values for each of the subpixels on a subpixel-by-subpixel basis according to an image 32 or portion thereof to be displayed. Each subpixel may be individually controlled to facilitate the corresponding pixel 30 generating a color desired for a corresponding portion of the image 32 to be displayed. The image 32 is shown to have a brighter central portion 34 surrounded by darker portions to demonstrate an exemplary scenario where portions of the display element 24 may be devoid of images, i.e., black, or otherwise include a minimal amount of color.

The quantity of pixels 30 comprising the display element 24 may vary depending on desired resolution, with some of the more common resolutions including a full HD display having 2,073,600 pixels 30 arranged in a 1920×1080 pixel pattern and 4K display having 8,294,400 pixels 30 arranged in a 3840×2160 pixel pattern. The colors capable of being presented with the display element 24 may be determined based on a color depth or a bit depth, which may be defined as a quantity of bits per pixel (bpp) or the bit level. The bit level may be used to represent a color component capable of being produced by each pixel 30, which may vary depending on the capabilities of the pixels 30. One non-limiting aspect of the present disclosure contemplates the display signal D setting a grayscale value for each of the subpixels to represent the color to be produced therewith. A couple of the more common bit levels may correspond with each subpixel being operable at an 8-bit level, a 10-bit level, etc., with the display element 24 being correspondingly operable on a per pixel basis at a 24-bit level, 30-bit level, etc. In the case of the subpixels being operable at the 8-bit level, the corresponding grayscale values may correspond with 0-255, and in the case of the subpixels being operable at the 10-bit level, the corresponding grade scale values may correspond with 0-1023.

Figure 4:
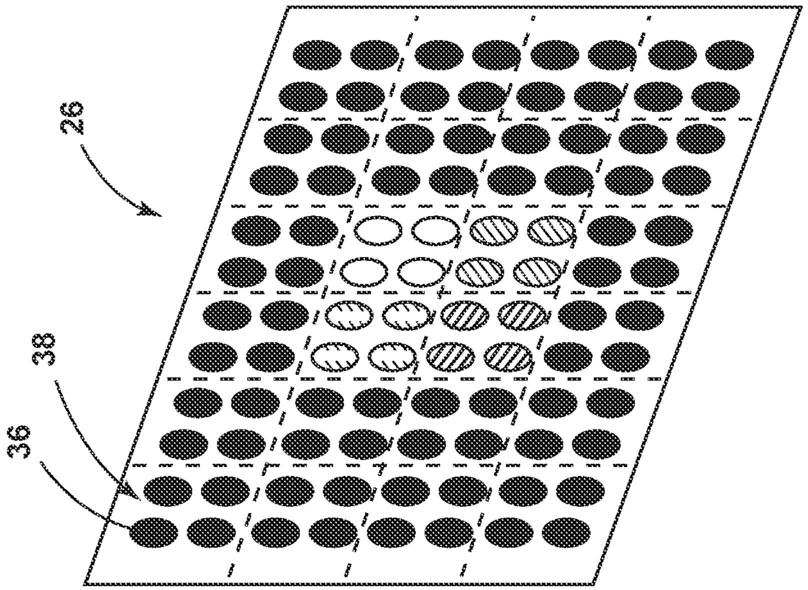
FIG. 4 illustrates a schematic diagram of a backlight in accordance with one non-limiting aspect of the present disclosure.

FIG. 4 illustrates a schematic diagram of the backlight 26 in accordance with one non-limiting aspect of the present disclosure. The backlight 26 may be comprised of a plurality of LEDs or other illumination sources 36 capable of being individually controlled with the illumination signal I. The LEDs 36 may be arrayed according to a plurality of illumination zones 38, with each illumination zone including one or more LEDs 36. A plurality of dashed lines are shown for purposes of demarcating the illumination zones 38. While other configurations may be employed, the illumination zones 38 may each include an equal number of LEDs 36, optionally with the quantity of LEDs 36 within each illumination zone 38 being less than the quantity of pixels 30 included within a corresponding segment 40 of the display element 24. The corresponding segments 40 of the display element 24 may be demarcated in a similar manner according to a plurality of dashed lines (FIG. 3). The luminance signal I may include luminance values for each illumination zone such that a normalized backlight luminance value may be separately generated for each zone, e.g., by correspondingly controlling the current and/or voltage used to power the LEDs 36 therein. The normalized luminance value set for each zone 38 may be used to define an intensity, brightness, etc. for the LEDs 36 therein such that the LEDs 36 within each zone 38 may generate the same amount of luminance for backlighting.

One non-limiting aspect of the present disclosure contemplates managing power dissipation of the display 12 by minimizing power consumed in backlighting the display element with the backlight 26, and optionally, doing so on a zone-by-zone basis whereby normalized luminance values may be set for each of the illumination zones 38. The capability to individualistically determine the normalized luminance values may be beneficial in enabling the power dissipation strategies herein to provide a minimum amount of illumination needed to meet the color depth desired for a corresponding segment of the display element 24. One non-limiting aspect of the present disclosure additionally contemplates managing power dissipation of the display 12 by selectively controlling the grayscale values on a subpixel-by-subpixel basis according to the illumination zones 38 associated therewith so that the coloring of the subpixels within each segment of the display element 24 backlit by each of the illumination zones 38 may be adjusted in concert with the backlighting thereof to minimize power dissipation and maximize power savings.

To accurately predict backlight powering of each illumination zone 38, the present disclosure contemplates developing predictive equations using the concept of zone intensity, which may be directly proportional to backlight power. The luminance of a subpixel may be described per Equation 3-1.

$$L_{RGB} = K_{RGB}\left(\frac{GS_{RGB}}{B}\right)^{\gamma} \times L_{Backlight} \tag{3-1}$$

Where, $L_{RGB}$ corresponds with luminance of the respective subpixels, $L_{Backlight}$ corresponds with luminance of the backlight 26, $K_{RGB}$ corresponds with transmission coefficients for the respective subpixels, and $GS_{RGB}$ corresponds with grayscale values for the respective subpixels. The FALD controller 22 may be configured to use the concept of video expansion where the zone luminance may be reduced to the lowest luminance necessary to support the highest luminance pixel 30 to be backlit by the corresponding zone. This may be accomplished in part by remapping the gray shade values for each of the pixels 30 based on a portion of the image to be displayed therewith. As an example, if the highest gray shade in a zone is 200, the luminance may be lowered so that when GS=200 is remapped to GS=255, the original desired luminance may be obtained. To simplify the analysis, a normalized backlight luminance of unity may be invoked per Equation 3-2.

$$\left(\frac{GS_O}{B}\right)^{\gamma} \times 1 = \left(\frac{GS_N}{B}\right)^{\gamma} \times \left(\frac{GS_{Omax}}{B}\right)^{\gamma_i} \tag{3-2}$$

Where, $GS_N$ corresponds with the output grayscale values, GSo corresponds with the input grayscale values, B corresponds with a grayscale bit level for the display element 24, GSomax corresponds with the maximum grayscale value of the corresponding one of the zones, $\gamma$ corresponds with a transmissivity gamma coefficient for the display element 24, and $\gamma_i$ corresponds with an intensity gamma coefficient. B may be a grayscale bit level for the display element 24, which, for example, may be defined as $B=(2)^n-1$, with n being the bit level, e.g., 8, 10, etc.

The last term, $$\left(\frac{GS_{Omax}}{B}\right)^{\gamma_i},$$

may be used to describe how much of the illumination zone intensity may be reduced from unity. The lefthand side of Equation 3-2 may be used to describe the desired video output luminance with a backlight luminance of 1, and the right side may be used to describe the output luminance with a remapped gray shade ($GS_N$) and a reduced backlight LED zone luminance which is less than or equal to 1.

Cancelling the B term yields Equation 3-3.

$$GS_O^{\gamma} = GS_N^{\gamma}\left(\frac{GS_{Omax}}{B}\right)^{\gamma_i} \tag{3-3}$$

To solve for $GS_N$, Equation 3-3 may be rearranged into Equation 3-4.

$$GS_N^{\gamma} = \frac{GS_O^{\gamma}}{\left(\frac{GS_{Omax}}{B}\right)^{\gamma_i}} = GS_O^{\gamma}\left(\frac{B}{GS_{Omax}}\right)^{\gamma_i} \tag{3-4}$$

Solving for $GS_N$ yields Equation 3-5.

$$GS_N = \left[GS_O^{\gamma}\left(\frac{B}{GS_{Omax}}\right)^{\gamma_i}\right]^{(1/\gamma)} = GS_O\left(\frac{B}{GS_{Omax}}\right)^{\gamma_i/\gamma} \tag{3-5}$$

Therefore, the gray shade remapping gain, $$\left(\frac{B}{GS_{Omax}}\right)^{\gamma_i/\gamma},$$

changes from zone to zone and depends on the maximum gray shade, GSOmax, within a zone and how aggressive the gain function is set with the γi variable. The maximum new gray shade value, $GS_{Nmax}$, may be determined by setting GSO to $GS_{Omax}$ in Equation 3-5 as shown in Equation 3-6.

$$GS_{Nmax} = GS_{Omax}\left(\frac{B}{GS_{Omax}}\right)^{\gamma_i/\gamma} \tag{3-6}$$

Manipulating Equation 3-6 according to the laws of exponents yields Equation 3-7.

$$GS_{Nmax} = GS_{Omax}\left(GS_{Omax}^{-1}\right)^{\gamma_i/\gamma}(B)^{\gamma_i/\gamma} \tag{3-7}$$

The two $GS_{Omax}$ terms may be combined according to Equation 3-8.

$$GS_{Nmax} = (GS_{Omax})^{\left(\frac{\gamma}{\gamma}-\frac{\gamma_i}{\gamma}\right)}(B)^{\gamma_i/\gamma} \tag{3-8}$$

Equation 3-8 may then be simplified to become Equation 3-9.

$$GS_{Nmax} = (GS_{Omax})^{\left(\frac{\gamma-\gamma_i}{\gamma}\right)}(B)^{\gamma_i/\gamma} \tag{3-9}$$

Equation 3-5 may be rewritten as Equation 3-10.

$$GS_N = GS_O\left(\frac{B}{GS_{Omax}}\right)^{\gamma_i/\gamma} \tag{3-10}$$

The normalized zone intensity may be determined according to Equation 3-11, as can be from the last term in Equation 3-2.

$$I_N = \left(\frac{GS_{Omax}}{B}\right)^{\gamma_i} \tag{3-11}$$

Equations 3-9, 3-10, and 3-11 may be used to foundation a video expansion function for the display element, optionally with γi ranging from 0 to γ. Although γi may range from 0 to the display gamma, γ, it may be instructive to consider three example cases.

$$\gamma_i = 0 \quad \text{(Case \#1)}$$

$$\gamma_i = 1 \quad \text{(Case \#2)}$$

$$\gamma_i = \gamma \quad \text{(Case \#3)}$$

For the first case of $\gamma_i=0$, Equation 3-10 becomes Equation 3-12, Equation 3-9 becomes Equation 3-13, and Equation 3-11 becomes Equation 3-14. Case #1 may correspond with the gain being 1 and no gray shade remapping occurs.

$$GS_N = GS_O \tag{3-12}$$

$$GS_{Nmax} = GS_{Omax} \tag{3-13}$$

For the second case of $\gamma_i=1$, Equation 3-10 becomes Equation 3-13, Equation 3-9 becomes Equation 3-14, and Equation 3-11 becomes Equation 3-16.

$$GS_N = GS_O\left(\frac{B}{GS_{Omax}}\right)^{1/\gamma} \tag{3-14}$$

$$GS_{Nmax} = (GS_{Omax})^{\left(\frac{\gamma-1}{\gamma}\right)}(B)^{1/\gamma} \tag{3-15}$$

$$I_N = \frac{GS_{Omax}}{B} \tag{3-16}$$

For the third case of $\gamma_i=\gamma$, Equation 3-10 becomes Equation 3-17, Equation 3-9 becomes Equation 3-18, and Equation 3-11 becomes Equation 3-19. As will be seen, case #3 may be the most power efficient, but may have the highest gray shade remapping gains.

$$GS_N = GS_O\left(\frac{B}{GS_{Omax}}\right) \tag{3-17}$$

$$GS_{Nmax} = B(3-18) \tag{3-18}$$

$$I_N = \left(\frac{GS_{Omax}}{B}\right)^{\gamma} \tag{3-19}$$

Figure 5:
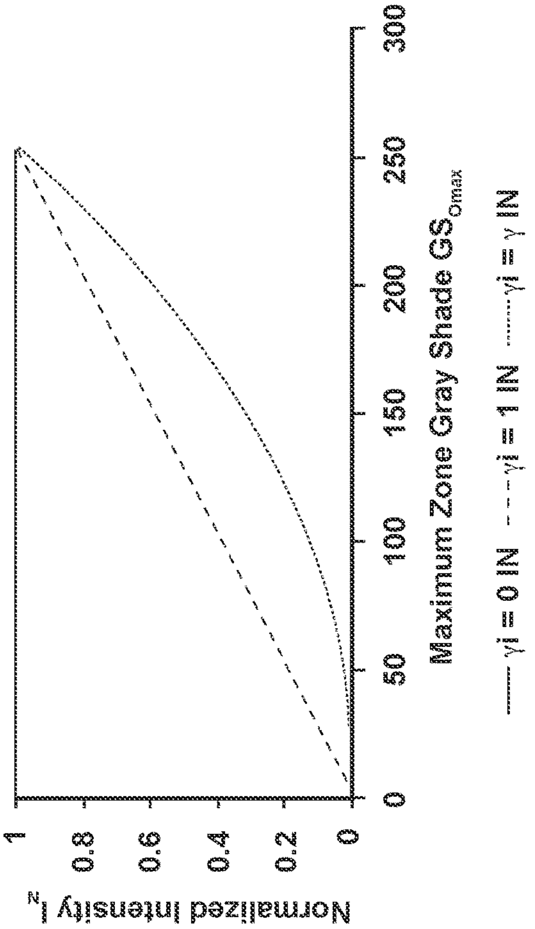
FIG. 5 illustrates a normalized zone intensity plot in accordance with one non-limiting aspect of the present disclosure.

FIG. 5 illustrates a normalized zone intensity plot 50 in accordance with one non-limiting aspect of the present disclosure. Assuming B=255, from this plot, the most inefficient system (blue line) is when $\gamma_i=0$ because the zone luminance is set at the maximum value regardless of the maximum gray shade GSOmax within a zone. The most efficient system (gray line) is when $\gamma_i=\gamma$ because the zone luminance is set to the lowest possible intensity value where the highest gray shade in the zone is remapped to GS=255 using the highest gray shade remapping gain. An intermediate compromise (orange line) is when 7i=1.

Figure 6:
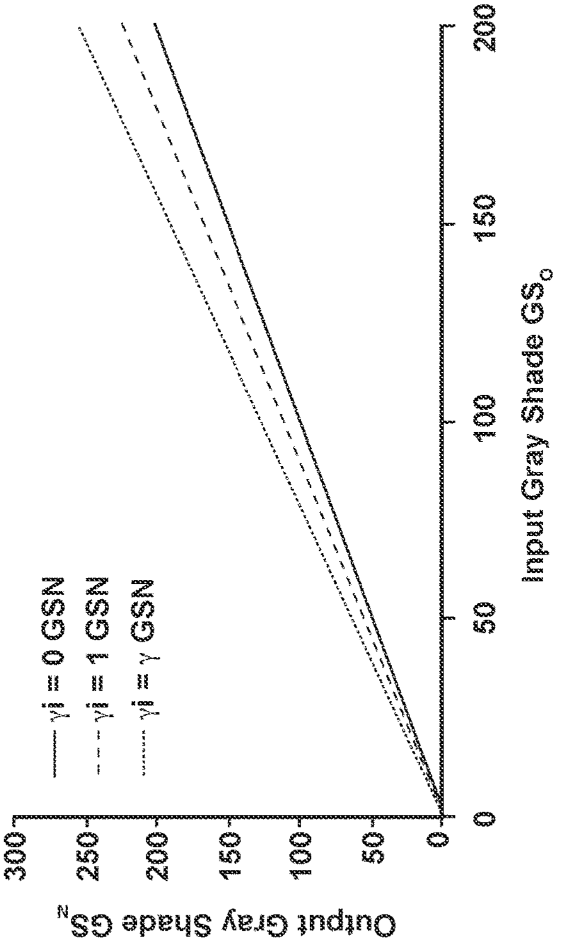
FIG. 6 illustrates a grayscale remapping plot in accordance with one non-limiting aspect of the present disclosure.

FIG. 6 illustrates a grayscale remapping plot 52 in accordance with one non-limiting aspect of the present disclosure. The plot assumes, as an example, if the $GS_{O_{max}}$ in a zone is gray shade 200, that: for γi=0, the input gray shade $GS_O$=200 may be mapped to $GS_N$=200 and therefore no power is saved; for γi=1, the input gray shade $GS_O$=200 may be mapped to $GS_N$=223 and according to FIG. 5 the power savings may be 20% at input gray shade 200; and for γi=γ, the input gray shade $GS_O$=200 gets mapped to $GS_N$=255 and according to FIG. 5 the power savings may be approximately 40% at input gray shade 200.

Figure 7:
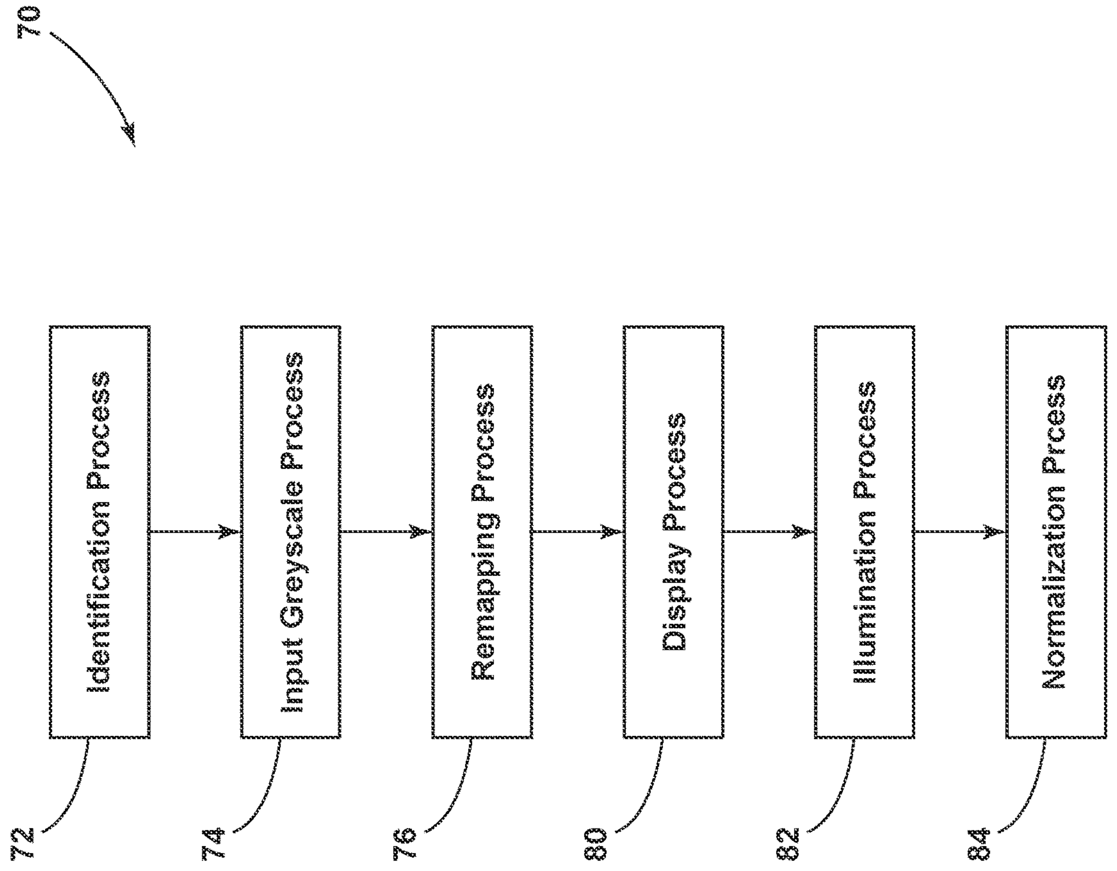
FIG. 7 illustrates a flowchart of a method for minimizing power disabused dissipation in accordance with one non-limiting aspect of the present disclosure.

FIG. 7 illustrates a flowchart 70 of a method for minimizing power dissipation for the display in accordance with one non-limiting aspect of the present disclosure. The method may be facilitated with the controller 22 being configured with a display controller and a backlight controller, with operations and processes thereof being part of the controller 22 and/or defined according to corresponding sets of non-transitory instructions. The method contemplates the controller 22, or more specifically the display controller, having capabilities sufficient for processing images, video, i.e., sequences of images, and other media for presentation through the display element 24, however, a separate media player or the like may be in communication therewith to facilitate some or all the processing described herein. The method is predominately described with respect to a single instance of an image 32 being displayed, however, the processing associated therewith may be repeated quickly to facilitate displaying moving or multiple images as video and the like.

Block 72 relates to the display controller performing an identification process to identify the image 32 to be displayed with the display element 24. Block 74 relates to the display controller performing an input grayscale process for determining an input grayscale value for each of a plurality of pixels 30 to be used in display the image 32. This may include processing or otherwise assessing the image in the raw or as otherwise received in an original state, such as from an image source within the vehicle 10 or elsewhere, before being processed in accordance with the present disclosure for display. Block 76 relates to the display controller performing a remapping process whereby the input grayscale values for the image 32 may be remapped to output grayscale values. The remapping process may occur on a pixel-by pixel level whereby the grayscale values for each of the subpixels associated therewith may be remapped from input grayscale values to output grayscale values on a subpixel-by subpixel basis. The remapping process may correspond with the display controller remapping the pixels associated with each illumination zone 38 such that at least one pixel 30 therein has a maximum possible grayscale value, e.g., 255, 1023, etc. The remapping process may optionally be performed relative to each illuminations zone 38 according to a remapping function, which may be represented as defined above in Equation 3-10.

Block 80 relates to a display process where the display controller may control the display element 24 to display the image 32 according to the output grayscale values. The correspondingly displayed image 32 may thereby be defined according to coloring associated with the output grayscale values determined for each illumination zone 38 on a subpixel-by-subpixel basis relative to the input grayscale values set for the image 32 when received at the display 12. The remapping of the input grayscale values to the output grayscale values and the subsequent display of the image 32 may correspondingly result in segments 40 of the display element 24 having grayscale values differing from those specified within the originally received image 32. This remapping may additionally occur according to the segments 40 of pixels 30 arranged relative to each of the illumination zones 38 such that the remapping may occur per zone 38 to maximize scale up the coloring thereof to a desirable level, which for exemplary purposes is presented as being a maximum level of 255, 1023, etc.

The capability of the present disclosure to remap the grayscale values for each pixel 30 relative to the underlying illumination zones 38 may be beneficial in proportionally decreasing the power used when backlighting. In other words, the capabilities to remap the grayscale values to maximize color in each illumination zone 38 may in turn result in limiting the amount of power needed for the backlighting thereof due to the colors being magnified and thus correspondingly requiring less backlighting to provide the same output image. The image 32 presented through the display element 24 may thereby be effectively displayed with a color output, luminance, etc. matching the image 32 as received at the display but with less power dissipation than would be necessary if the grayscale values were not remapped according to the underlying illumination zones 38. The additional capabilities of the present disclosure to adjust the normalized backlight luminance of each of the illumination zone 38 may be further beneficial in enabling the power consumed in backlighting each zone 38 to be maximally minimized depending on the coloring of the portion of the image associated therewith.

To facilitate individually controlling the backlighting produced at each of the illumination zones, one non-aspect of the present disclosure contemplates the backlighting controller operating in concert with the display controller to selectively determine a normalized backlight luminance for each of the illumination zones. Block 82 relates to the backlight controller performing an illumination process for determining a maximum grayscale value for each of the illumination zones 38. The maximum grayscale value within each of the illumination zones 38 may correspond with a greatest one of the input grayscale values associated therewith. The use of the input grayscale value to determine the maximum grayscale value may be desirable in order to scale the backlighting of each illumination zone in proportion to the grayscale remapping that was also scaled relative to the greatest input grayscale value. Block 84 relates to performing a normalization process for controlling backlighting of each illumination zone 38 according to a normalized backlight luminance determined therefor. The normalized backlight luminance may be determined for each illumination zone according to a luminance function, which may be represented as defined above in Equation 3-11. The normalized backlight luminance used to control the backlighting of each illumination zone 38 may be timed relative to the corresponding image 32 such that the backlighting may change in concert with changes in the image 32 being displayed.

The terms "comprising", "including", and "having" are inclusive and therefore specify the presence of stated features, steps, operations, elements, or components, but do not preclude the presence or addition of one or more other features, steps, operations, elements, or components. Orders of steps, processes, and operations may be altered when possible, and additional or alternative steps may be employed. As used in this specification, the term "or" includes any one and all combinations of the associated listed items. The term "any of" is understood to include any possible combination of referenced items, including "any one of" the referenced items. "A", "an", "the", "at least one", and "one or more" are used interchangeably to indicate that at least one of the items is present. A plurality of such items may be present unless the context clearly indicates otherwise. All numerical values of parameters (e.g., of quantities or conditions), unless otherwise indicated expressly or clearly in view of the context, including the appended claims, are to be understood as being modified in all instances by the term "about" whether or not "about" actually appears before the numerical value. A component that is "configured to" perform a specified function is capable of performing the specified function without alteration, rather than merely having potential to perform the specified function after further modification. In other words, the described hardware, when expressly configured to perform the specified function, is specifically selected, created, implemented, utilized, programmed, and/or designed for the purpose of performing the specified function.

While various embodiments have been described, the description is intended to be exemplary, rather than limiting and it will be apparent to those of ordinary skill in the art that many more embodiments and implementations are possible that are within the scope of the embodiments. Any feature of any embodiment may be used in combination with or substituted for any other feature or element in any other embodiment unless specifically restricted. Accordingly, the embodiments are not to be restricted except in light of the attached claims and their equivalents. Also, various modifications and changes may be made within the scope of the attached claims. Although several modes for carrying out the many aspects of the present teachings have been described in detail, those familiar with the art to which these teachings relate will recognize various alternative aspects for practicing the present teachings that are within the scope of the appended claims. It is intended that all matter contained in the above description or shown in the accompanying drawings shall be interpreted as illustrative and exemplary of the entire range of alternative embodiments that an ordinarily skilled artisan would recognize as implied by, structurally and/or functionally equivalent to, or otherwise rendered obvious based upon the included content, and not as limited solely to those explicitly depicted and/or described embodiments.

What is claimed is:

1. A full area local dimming (FALD) display, comprising:

a liquid crystal display (LCD);

a backlight having a plurality of light emitting diodes (LEDs) configured for backlighting the LCD, the LEDs arrayed according to a plurality of illumination zones;

a display controller configured for:

identifying an image to be displayed with the LCD;

determining an input grayscale value for each of a plurality of pixels comprising the image;

remapping the input grayscale values to output grayscale values; and controlling the LCD to display the image according to the output grayscale values;

a backlight controller configured for:

determining a maximum grayscale value for each of the illumination zones, the maximum grayscale value for each illumination zone corresponding with a greatest one of the input grayscale values therein; and controlling a normalized backlight luminance for each illumination zone according to the maximum grayscale value determined therefor.

2. The FALD display according to claim 1, wherein:

the display controller is configured for remapping the input grayscale values on a zone-by-zone basis according to a remapping function represented as:

$$GS_N = GS_O\left(\frac{B}{GS_{Omax}}\right)^{\gamma_i/\gamma}$$

where $GS_N$ corresponds with the output grayscale values, GSo corresponds with the input grayscale values, B corresponds with a grayscale bit level for the LCD, GSomax corresponds with the maximum grayscale value of the input grayscale values for the corresponding one of the illumination zones, $\gamma$ corresponds with a transmissivity gamma coefficient for the LCD, and $\gamma_i$ corresponds with an intensity gamma coefficient.

3. The FALD display according to claim 2, wherein:

the backlight controller is configured for determining the normalized backlight luminance for each illumination zone on a zone-by-zone basis according to a luminance function represented as:

$$I_N = \left(\frac{GS_{Omax}}{B}\right)^{\gamma_i}$$

where $I_N$ corresponds with the normalized backlight luminance.

4. The FALD display according to claim 3, wherein:

$$B = (2)^n - 1$$

where n is a quantity of bits allocated for each pixel.

5. The FALD according to claim 4, wherein:

each pixel includes a red subpixel, a green subpixel, and a blue subpixel, the remapping occurring on a subpixel-by-subpixel basis.

6. The FALD according to claim 5, wherein:

n=8 when the grayscale bit level is 8.

7. The FALD display according to claim 4, wherein:

$\gamma$ equals $\gamma_i$.

8. The FALD display according to claim 4, wherein:

$$1 < \gamma_i \leq \gamma.$$

9. The FALD according to claim 1, wherein:

the display controller is configured for remapping the input grayscale values on a zone-by-zone basis such that the input grayscale values within each of the illumination zones are each proportionally increased until at least one pixel therein has a maximum possible grayscale value.

10. A method for minimizing power dissipation of a full area local dimming (FALD) display, the FALD display having a display configured for displaying an image and a backlight having a plurality of illumination zones configured for backlighting the display, comprising:

determining an input grayscale value for each of a plurality of pixels comprising the image;

remapping the input grayscale values to output grayscale values;

displaying the image according to the output grayscale values;

determining a maximum grayscale value for each of the illumination zones, the maximum grayscale value for each illumination zone corresponding with a greatest one of the input grayscale values therein; and controlling a normalized backlight luminance for each illumination zone according to the maximum grayscale value determined therefor.

11. The method according to claim 10, further comprising:

determining the normalized backlight luminance for each illumination zone on a zone-by-zone basis according to a luminance function represented as:

$$I_N = \left(\frac{GS_{Omax}}{B}\right)^{\gamma_i}$$

where $I_N$ corresponds with the backlight luminance, B corresponds with a grayscale bit level for the display, GSomax corresponds with the maximum grayscale value of the input grayscale values for the corresponding one of the illumination zones, and $\gamma_i$ corresponds with an intensity gamma coefficient.

12. The method according to claim 11, further comprising:

remapping the input grayscale values on a zone-by-zone basis according to a remapping function represented as:

$$GS_N = GS_O\left(\frac{B}{GS_{Omax}}\right)^{\gamma_i/\gamma}$$

where $GS_N$ corresponds with the output grayscale values, GSo corresponds with the input grayscale values, and $\gamma$ corresponds with a transmissivity gamma coefficient for the display.

13. The method according to claim 12, wherein:

$$B = (2)^n - 1$$

where n is a quantity of bits allocated for each pixel.

14. The method according to claim 13, wherein:

$$1 < \gamma_i \leq \gamma.$$

15. The method according to claim 10, further comprising:

remapping the input grayscale values on a zone-by-zone basis such that the input grayscale values within each illumination zone are each proportionally increased until at least one pixel therein has a maximum possible grayscale value.

16. A controller for a full area local dimming (FALD) display, the controller including a computer-readable storage medium having a plurality of non-transitory instructions stored thereon, which when executed with a processor of the controller, are operable for:

determining an input grayscale value for each of a plurality of pixels comprising an image to be displayed through a display;

remapping the input grayscale values to output grayscale values;

displaying the image according to the output grayscale values;

determining a maximum grayscale value for each of a plurality of illumination zones comprising a backlight of the display, the maximum grayscale value for each illumination zone corresponding with a greatest one of the input grayscale values therein; and controlling a normalized backlight luminance for each illumination zone according to the maximum grayscale value determined therefor.

17. The controller according to claim 16, wherein the non-transitory instructions are operable for:

remapping the input grayscale values on a zone-by-zone basis according to a remapping function represented as:

$$GS_N = GS_O\left(\frac{B}{GS_{Omax}}\right)^{\gamma_i/\gamma}$$

where $GS_N$ corresponds with the output grayscale values, GSo corresponds with the input grayscale values, B corresponds with a grayscale bit level for the display, GSomax corresponds with the maximum grayscale value of the input grayscale values for the corresponding one of the illumination zones, $\gamma$ corresponds with a transmissivity gamma coefficient for the display, and $\gamma_i$ corresponds with an intensity gamma coefficient.

18. The controller according to claim 17, wherein the non-transitory instructions are operable for:

determining the normalized backlight luminance on a zone-by-zone basis according to a luminance function represented as:

$$I_N = \left(\frac{GS_{Omax}}{B}\right)^{\gamma_i}$$

where $I_N$ corresponds with the backlight luminance.

19. The controller according to claim 18, wherein:

$$B = (2)^n - 1$$

where n is a quantity of bits allocated for each pixel.

20. The controller according to claim 19, wherein:

$$1 < \gamma_i \leq \gamma.$$

* * * * *